(12) United States Patent
Zhu et al.

(10) Patent No.: US 11,841,282 B2
(45) Date of Patent: Dec. 12, 2023

(54) STRAIN GAUGE INSULATED AGAINST MOISTURE PENETRATION AND METHOD OF MANUFACTURING SAME

(71) Applicants: Mettler-Toledo (Changzhou) Precision Instrument Co. Ltd., Changzhou (CN); Mettler-Toledo (Changzhou) Measurement Technology Co. Ltd., Changzhou (CN); Mettler-Toledo International Trading (Shanghai) Co. Ltd., Shanghai (CN); Mettler-Toledo GmbH, Greifensee (CH)

(72) Inventors: XiangQun Zhu, Changzhou (CN); Zhiguo Shi, Changzhou (CN); Lei Xu, Changzhou (CN); Jean-Christophe Emery, Changzhou (CN)

(73) Assignees: Mettler-Toledo (Changzhou) Precision Instrument Co. Ltd., Changzhou (CN); Mettler-Toledo (Changzhou) Measurement Technology Co. Ltd., Changzhou (CN); Mettler-Toledo International Trading (Shanghai) Co. Ltd., Shanghai (CN); Mettler-Toledo GmbH, Greifensee (CH)

(*) Notice: Subject to any disclaimer, the term of this patent is extended or adjusted under 35 U.S.C. 154(b) by 359 days.

(21) Appl. No.: 17/269,910

(22) PCT Filed: Aug. 30, 2019

(86) PCT No.: PCT/EP2019/073246
§ 371 (c)(1),
(2) Date: Feb. 19, 2021

(87) PCT Pub. No.: WO2020/043892
PCT Pub. Date: Mar. 5, 2020

(65) Prior Publication Data
US 2021/0262873 A1   Aug. 26, 2021

(30) Foreign Application Priority Data

Aug. 31, 2018   (EP) .................................... 18191935

(51) Int. Cl.
*G01L 1/00* (2006.01)
*G01L 1/22* (2006.01)
*G01L 1/26* (2006.01)

(52) U.S. Cl.
CPC .......... *G01L 1/2287* (2013.01); *G01L 1/2243* (2013.01); *G01L 1/26* (2013.01)

(58) Field of Classification Search
CPC ........ G01L 1/2287; G01L 1/2243; G01L 1/26
(Continued)

(56) References Cited

U.S. PATENT DOCUMENTS 3,599,139 A   8/1971   Low
4,015,326 A   4/1977   Brewer
(Continued)

FOREIGN PATENT DOCUMENTS

DE   29922560 U1   3/2000
JP   55-42156      3/1980
(Continued)

OTHER PUBLICATIONS

Organisation Internationale De Métrologie Légale, Erratum: International Recommendation, Metrological regulation for load cells, Nov. 2000, Edition 2000 (E), pp. 1-9, OIML R 60—Parts 1 and 2, Paris, France.

*Primary Examiner* — Max H Noori
(74) *Attorney, Agent, or Firm* — Standley Law Group LLP; Jeffrey S. Standley; Adam J. Smith

(57) ABSTRACT

A strain gauge (12, 21A, 21B, 25A, 25B, 31, 35, 41, 45) and method of manufacturing a strain gauge (12, 21A, 21B, 25A, 25B, 31, 41, 35, 45) against moisture penetration comprises or includes the step of producing a coated base or cover layer (Continued)

(14, 34, 44) by forming a moisture barrier coating (17) on the surface the latter.

24 Claims, 3 Drawing Sheets

(58) Field of Classification Search
USPC .................................................. 73/862.621
See application file for complete search history.

(56) References Cited

U.S. PATENT DOCUMENTS

| | | | |
|---|---|---|---|
| 4,307,371 A * | 12/1981 | Ort | G01L 1/2287 29/621.1 |
| 4,557,150 A | 12/1985 | Utsunomiya | |
| 4,957,177 A | 9/1990 | Hamilton et al. | |
| 5,052,505 A | 10/1991 | Naito et al. | |
| 5,404,124 A * | 4/1995 | Ruppin | G01B 7/20 338/5 |
| 5,631,622 A | 5/1997 | Hauber et al. | |
| 7,215,870 B2 | 5/2007 | Ziebart et al. | |
| 2005/0155435 A1* | 7/2005 | Ziebart | G01G 3/1412 73/781 |
| 2005/0160837 A1* | 7/2005 | Tellenbach | G01L 1/2287 73/862.625 |
| 2006/0213278 A1* | 9/2006 | Arms | G01B 7/16 73/781 |
| 2017/0213648 A1 | 7/2017 | Joyce et al. | |
| 2018/0217016 A1 | 8/2018 | Inamori et al. | |
| 2018/0328801 A1* | 11/2018 | Shapiro | G01L 1/2262 |

FOREIGN PATENT DOCUMENTS

| | | |
|---|---|---|
| JP | 5-28947 U | 4/1993 |
| JP | 2001-91205 A | 4/2001 |
| JP | 2010-243192 A | 10/2010 |

* cited by examiner

STRAIN GAUGE INSULATED AGAINST MOISTURE PENETRATION AND METHOD OF MANUFACTURING SAME

The invention concerns a strain gauge and a method of manufacturing strain gauges, which are insulated against moisture penetration. Of particular interest are strain gauges that are used in load cells, but no limitation is thereby implied or intended, as the inventive method is considered to be fully applicable to strain gauges that are used in other applications. Furthermore, the moisture insulation method according to the invention can be applied in one of three ways: a) in the manufacturing process of strain gages; b) to new strain gauges by themselves; or c) to strain gauges in their installed state on a load cell or on any object on which a strain measurement is to be performed. The scope of the invention extends to strain gauges as well as load cells that include a moisture-protectant insulation produced with the inventive method.

A conventional strain gauge that is currently available on the market typically has the form of a rectangular piece of polymer foil forming the carrier substrate on which a metallic resistor track is arranged in the shape of a meandering structure. The metallic resistor track is arranged on a metallic resistive foil material, which is combined to a strain gauge with the carrier substrate by means of a known lamination method followed by a known chemical etching method. Also arranged on the metallic resistive foil material are connector electrodes or electrode pads for contacting the resistor track. The connector electrodes are often made in one work operation together with the resistor track, and they consist therefore in most cases of the same material, which often is Constantan due to its low temperature dependency. Depending on the area of application, one finds carrier substrates of glass, ceramic materials, in many cases polymers, glass-fiber-reinforced polymers, or composite materials. To measure a mechanical deformation due to forces or stresses acting on an object, one or more strain gauges are adhesively attached to the surface of the unstressed object. Now, when the object is subjected to a force or stress, the resultant deformation of the object causes a change of the electrical resistance of the metallic resistor track of the strain gauge, which can be measured. In the case of a strain gauge load cell, the strain gauges are attached to the surface of the elastically deformable body (also called spring element) of the load cell, and the measurement of electrical resistance is used to determine the magnitude of the weight force acting on the load cell.

The metallic resistor tracks of a strain gauge may be topped by a cover layer referred to herein as mechanical protection cover, which has the purpose to shield the delicate resistor tracks from direct mechanical contact as well as to protect the resistor tracks from dirt and dust deposits. Thus, the metallic resistor tracks are sandwiched between the substrate foil and the mechanical protection cover, both of which are made of polymer materials, with a thickness of about 10 to 20 μm (micrometers). The polymer materials used in strain gages include, for example, polyimide, phenolic aldehyde, polyether ether ketone (PEEK) and related types of these materials. Apart from the properties that make them suitable for strain gauges, these materials on the other hand have the disadvantage of being hygroscopic, holding a varying percentage of water, depending on the humidity of the surrounding atmosphere. When humidity is adsorbed, the volume of polymer materials in strain gages will swell, which leads to small deformations in the metallic resistor tracks, which are intimately bonded to the polymer materials. In addition to the change in volume, the absorption of water also causes a change of the modulus of elasticity in polymer materials of strain gages. In the case of strain gauge load cells, the changes in volume and in the modulus of elasticity of the polymer materials of the strain gages have a harmful effect on the metrological performance of the load cell, causing drift of the no-load signal (zero point) and/or drift of the sensitivity (signal/load ratio) of the load cell, and/or creep (slow change away from an initially indicated value when a load is kept on the load cell over an extended period of time).

Consequently, in order to ensure that the weighing accuracy and reliability of strain gauge load cells are maintained even over periods of changing atmospheric humidity, the strain gauges need to be protected against moisture penetration. Load cells that are used in so-called "legal for trade" applications are subject to government regulations, which are internationally standardized according to "OIML R 60—Parts 1 and 2, Metrological Regulation for Load Cells", published by OIML (Organisation Internationale de Métrologie Légale, Paris, France). Included in this code of regulations are standardized procedures to test the weighing accuracy of a load cell in an environmental test chamber at different levels of atmospheric temperature and humidity. In the development and design of a load cell, it is one of the essential target specifications that the load cell has to pass these required OIML tests at the specified different levels of atmospheric temperature and humidity. Under these standardized procedures, the atmospheric humidity during the test is varied in a prescribed time cycle, which is necessarily of limited duration.

In order to meet the foregoing requirement, the strain gauges in a load cell have to be insulated against the penetration of moisture from the surrounding atmosphere. According to a first state-of-the-art solution as described and illustrated for example in U.S. Pat. No. 4,957,177, this can be accomplished in a cantilever load cell (also known as bending beam load cell or moment-insensitive load cell) by enclosing the bending beam with the strain gauges in a corrugated metal bellows, wherein the end rims of the bellows are welded to the cylindrical terminal portions at, respectively, the fixed end and the movable end of the cantilever load cell. The bellows may be filled with a gas, for example dry nitrogen. A bellows enclosure hermetically seals the strain gauge area of a load cell and thus provides absolute protection of the strain gauges against atmospheric humidity, but there are also some serious drawbacks. Residual stresses, which are introduced by the welding process and which may relax over time or when weighing loads are applied, can degrade the measuring accuracy of a load cell through drift and hysteresis of the indicated weight values. The relative magnitude of these effects in proportion to the weighing capacity is largest for load cells with a low weighing capacity, for example 6 kg×2 g, or 3 kg×1 g, which are typically used in retail weighing scales, one of the most important applications for low-capacity strain gauge load cells. Besides, the bellows, the welding process, and the subsequent leak testing of the hermetic seal add substantially to the manufacturing cost.

According to a second state-of-the-art solution, strain gauges for use in load cells are insulated against moisture penetration from the surrounding atmosphere by overlaying the area of the meandering resistor tracks with a metallic foil on top of an electrically insulating intermediate layer, leaving the connector tabs at the ends of the resistor tracks exposed. As described for example in U.S. Pat. No. 4,557, 150, the metallic foil coverings are applied to the strain gauges after the latter have been installed on the load cell body. Alternatively, for example according to U.S. Pat. No. 5,631,622, the strain gauges by themselves are manufactured and sold in a form that already includes the metallic foil covering. The metallic foil protects the resistor tracks against moisture penetrating through the top surface. However, due to the relatively high modulus of elasticity of the metallic foil material combined with the viscous properties of the polymer materials in the strain gauge and the adhesive bonding layers, the metal foil strongly affects the measurement performance of the load cell, causing drift of the no-load signal (zero point) and/or drift of the sensitivity (signal/load ratio) of the load cell, and/or creep (slow change away from an initially indicated value when a load is kept on the load cell over an extended period of time). As with the corrugated metal bellows described above, these effects manifest themselves most strongly in load cells with a low weighing capacity. Furthermore, there is a risk that holes or gaps in the intermediate layer between the resistor tracks and the foil cover may cause short circuits that by-pass a part of the meandering resistor tracks.

When using a material other than metal for the foil to avoid the high elasticity modulus, the replacement material with low modulus of elasticity needs a higher thickness to achieve a comparable protection. As with the metallic foil, the higher thickness affects the measurement performance of the load cell in the same manner as described above.

According to a third state-of-the-art solution described for example in EP1560011 A1, strain gauges for use in load cells are insulated against moisture penetration from the surrounding atmosphere by covering the strain gauge (except for the connector tabs at the ends of the resistor tracks) with a protective inorganic coating that either has a plurality of discrete layers of different materials or whose material composition varies in a continuous manner in the thickness direction of the coating. A surface-smoothing polymer layer is applied to the metallic resistor tracks, for example by brushing, spraying, rolling, or tampon-printing. The protective inorganic coating is subsequently applied on top of the surface-smoothing polymer layer through plasma-enhanced chemical vapor deposition (PECVD). A multi-layered inorganic coating with a plurality of discrete layers of different materials can be composed of alternating discrete layers of silicon nitride and silicon oxide. Other possible materials include metals, carbides and fluorides. A coating whose material composition varies continuously over the thickness can be formed as a single layer of silicon oxide nitride $SiO_xN_y$, wherein the ratio x/y varies over the thickness of the layer.

The protective coating according to the foregoing third solution as described in EP 1560011 A1 can be applied in the manufacturing process of strain gauges. The resultant product is a strain gauge, which is already moisture-protected before it is installed in a load cell. Alternatively, the protective coating can be applied to conventional (i.e. uncoated) strain gauges after they have been installed on a load cell body. In the latter alternative, the deposition process for the protective coating increases the manufacturing cost considerably, since the entire load cells have to be put into the vapor deposition chamber.

According to U.S. Pat. No. 5,052,505, a cantilever-style load cell can be moisture-protected by recessing the surface areas on which the strain gauges are installed and by subsequently covering the recesses with a moisture-proof cover sheet, for example a rubber sheet, so that there is no contact between the top surface of the strain gauge and the rubber sheet. In other words, each strain gauge is enclosed in its own cavity. A major concern with this solution would be that, in contrast to the aforementioned solution of U.S. Pat. No. 4,957,177 where the strain gauges are enclosed inside a metal bellows, which can be leak-tested, no leak test appears to be feasible for the small air spaces under the moisture-proof rubber sheet of U.S. Pat. No. 5,052,505.

According to another state-of-the-art solution described for example in EP 0667514 A1, strain gauges for use on flexure elements include a substrate formed from a resin material, a resistor provided on a surface of the substrate, and a fusion layer provided on an opposite surface to the surface on which the resistor is provided. The purpose of the fusion layer is to electrically insulate the strain gauge towards the flexure element. The fusion layer is a thermoplastic polyimide layer that may contain a resin and/or a filler other than the thermoplastic polyimide, in addition to the thermoplastic polyimide. Examples of the filler include inorganic fine particles of aluminium oxide, titanium oxide, boron nitride, and silicon oxide. The fusion layer is blended with a filler to adjust the linear expansion coefficient of the thermoplastic polyimide layer to be a value close to a linear expansion coefficient of the flexure element and is therefore only applied on the surface of the strain gauge that is facing the flexure element.

In view of these drawbacks of the prior-art solutions, it is therefore the objective of the present invention to provide a strain gauge and a method of manufacturing strain gauges which are insulated against moisture penetration, in particular for strain gauges that are designed for use in load cells or are already installed in load cells, so that:

a load cell equipped with strain gauges that are moisture-insulated according to the method will not only pass the humidity tests prescribed by the aforementioned standard OIML R-60, but also will pass the same humidity test when extending the test duration to about one year.

a weighing instrument incorporating one or more load cells equipped with strain gauges that are moisture-insulated according to the method will pass the humidity tests prescribed by the standard OIML R-76 for weighing instruments of the accuracy classes I, II and III.

the metrological performance of said moisture-insulated load cell, in comparison to a non-insulated but otherwise identical load cell, will not be degraded as a result of the insulation, the insulation can be applied in the manufacturing process of strain gauges, it can be added to finished strain gauges by themselves, or it can be applied to strain gauges that are already installed on the body of a load cell, and that regardless of whether the insulation is applied to a strain gauge by itself or to a strain gauge that is already installed on the body of a load cell, the method—in comparison to the existing state of the art—consistently yields high-quality results at a low manufacturing cost.

The foregoing objective is accomplished by a strain gauge according to independent claim 1, and by a method in accordance with the independent claims 7, 12, 13, and 14. Detail aspects, further developed versions and variations of the strain gauge and the methods are set forth in the dependent claims.

The independent claims have all in common that the environmentally exposed surface of polymer material of a strain gauge is reduced, i.e. the polymer material, which is used in the manufacturing or installation process of strain gauges, receives a moisture barrier coating on the surface of the latter.

The inventive strain gauge insulated against moisture penetration comprises a base layer from polymer substrate foil material, a resistor track layer on a metallic resistive foil material, the resistor track is in the shape of a meandering structure and has electrode pads for contacting the resistor track. The resistor track layer is laminated together with the base layer, and is produced by means of a chemical etching method on the laminated layers. According to the invention a moisture barrier coating is formed, by means of a deposition process, on all sides of the base layer so that the base layer is encapsulated by the moisture barrier coating, and/or the strain gauge further comprises a cover layer from polymer film foil material, and a moisture barrier coating is formed, by means of a deposition process, on at least one side of the cover layer, wherein the coated cover layer is overlaid on the surface of the resistor track layer to cover at least part of the strain gauge.

The inventive method of manufacturing a strain gauge insulated against moisture penetration includes the steps of: providing a base layer from polymer substrate foil material, providing a resistor track layer on a metallic resistive foil material, the resistor track is in the shape of a meandering structure and has electrode pads for contacting the resistor track, producing a coated base layer by forming a moisture barrier coating on all surface sides of the base layer so that the base layer is encapsulated by the moisture barrier coating by means of a deposition process, laminating the resistor track layer together with the coated base layer, and producing a strain gauge by means of a chemical etching method on the laminated layers.

Another inventive method of manufacturing a strain gauge insulated against moisture penetration includes the steps of: providing a cover layer from polymer film foil material, producing a coated cover layer by forming a moisture barrier coating on the surface of the coated cover layer by means of a deposition process, and applying the coated cover layer to the strain gauge to cover at least a part of the latter. This other method of manufacturing a strain gauge can also be applied to strain gauges that have been manufactured as described in the paragraph before.

Preferably, the surface of the strain gauge, which remains uncovered after the application of the coated cover layer, is overlaid by additional metallic material from the resistor track layer, wherein the additional metallic material has no electrically conductive connection to the metallic resistor track or the electrode pads. The additional metallic material is made in one work operation together with the resistor track and the electrode pads, and it consists therefore in most cases of the same material.

Advantageously, when applying the coated cover layer to a strain gauge, it is also possible to overlay the entire strain gauge with the moisture-insulating polymer film. In this case, an opening is made through the coated cover layer to the electrode pads of the strain gauge.

Polymers that are suitable for the base layer or the cover layer include, but are not limited to, for example PET (polyethylene terephthalate), polyimide, and PEEK (polyether ether ketone). The cover layer used in the method according to the invention typically has a thickness in the range of micrometers. A greater thickness appears feasible for load cells of higher weighing capacity, for example shear beam load cells and column load cells. Coated cover layers as thick as, e.g., 500 µm (micrometers) may be feasible for such high-capacity load cells and are considered to lie within the scope of this invention. In any event, it will be understood that the thickness of the cover layer is not a defining or limiting factor of the present invention.

As in the state-of-the-art solution described for example in EP 1560011 A1, which is also owned by the assignee of the present invention, the moisture barrier coating is preferably a non-metallic inorganic coating that either has a plurality of discrete layers of different materials or whose material composition varies in a continuous manner in the thickness direction perpendicular to the coating surface. The advantages of such a stratified structure for a moisture barrier coating are explained extensively in EP 1560011 A1 which is hereby incorporated by reference in the present writing. Non-metallic inorganic materials that are suitable for the moisture barrier coating used in the method according to the invention include for example $SiO_2$, $Al_2O_3$, TiO and SiN. Also possible are inorganic-organic multi-layered structures. Coating techniques that can be used to apply the moisture barrier coating include for example chemical vapour deposition (CVD), plasma-enhanced chemical vapor deposition (PECVD), physical vapor deposition (PVD), and atomic layer deposition (ALD).

The moisture barrier coating that is deposited on the base layer or the cover layer typically has a thickness of no more than 200 nanometers. Furthermore, the moisture barrier coating can be deposited on one side or on both sides of the film foil, or the film foil could also be encapsulated by the coating on all sides, including the very narrow surface strips around the border of the film foil.

The base layer or the cover layer with the moisture barrier coating will hereinafter be referred to as coated base layer or coated cover layer respectively.

A conventional strain gauge is herein considered as a strain gauge currently available on the market, i.e. with a base layer having no moisture barrier coating.

The method steps of applying the moisture-insulating polymer film to a strain gauge can be implemented in three different ways A, B, C, as follows:

A. The installation of strain gauges on the body of a load cell (or another object on which strain measurements are to be performed) and the installation of the coated cover layer on top of the strain gauges are combined with each other. The strain gauges are placed on the load cell body with application of the requisite bonding agent, the coating cover layers with application of the requisite bonding agent are overlaid to cover at least a part of the strain gauges, the installation of the strain gauges and coated cover layers on the load cell body is secured with pressure clamps, and the entire assembly is heat-cured in an oven to solidify the adhesive bonds.

B. The installation of the coated cover layer is performed on strain gauges that have already been installed and undergone the heat curing of their adhesive bonds. The coated cover layers, with application of the requisite bonding agent, are overlaid to cover at least a part of the strain gauges, the installation of coated cover layers on the strain gauges is secured with pressure clamps, and the entire assembly is heat-cured in an oven to solidify the adhesive bonds. If a room-temperature-curing adhesive is used, the oven-curing after the installation of the coated cover layer becomes unnecessary.

C. The installation of the coated cover layer is performed during the manufacturing process of strain gauges, so that the resultant product is a moisture-insulated strain gauge. The installation of the coated cover layer can be performed on individual strain gauges or on multi-unit sheets that are subsequently cut up into individual strain gauges. Strain gauges are normally produced in the form of multi-unit sheets, which are subsequently cut up into the final form of individual strain gauges that represent the final product.

Particularly in the case where the coated cover layer is applied to a strain-gauge that has already been placed or permanently installed on the body of a load cell, the method of the present invention has an important advantage over the earlier solution of assignee's patent EP 1560011 A1 which has been described hereinabove. With the earlier solution, it was necessary to put the entire load cell inside an evaporation chamber in order to deposit the moisture-insulating coating on the surface-smoothing polymer layer. In comparison, the method of the current invention wherein the moisture-insulating coating is applied to a cover layer and the resulting coated cover layer is subsequently put over the strain gauge makes much more efficient use of the vapor-deposition chamber, resulting in significant cost savings.

Detailed implementations of the present invention are illustrated in the attached drawings and explained in the following descriptions of the drawings and exemplary embodiments, like reference numerals across the several views refer to identical or equivalent features, wherein FIG. 1 represents a three-dimensional view of a dual beam cantilever load cell;

Figure 1:
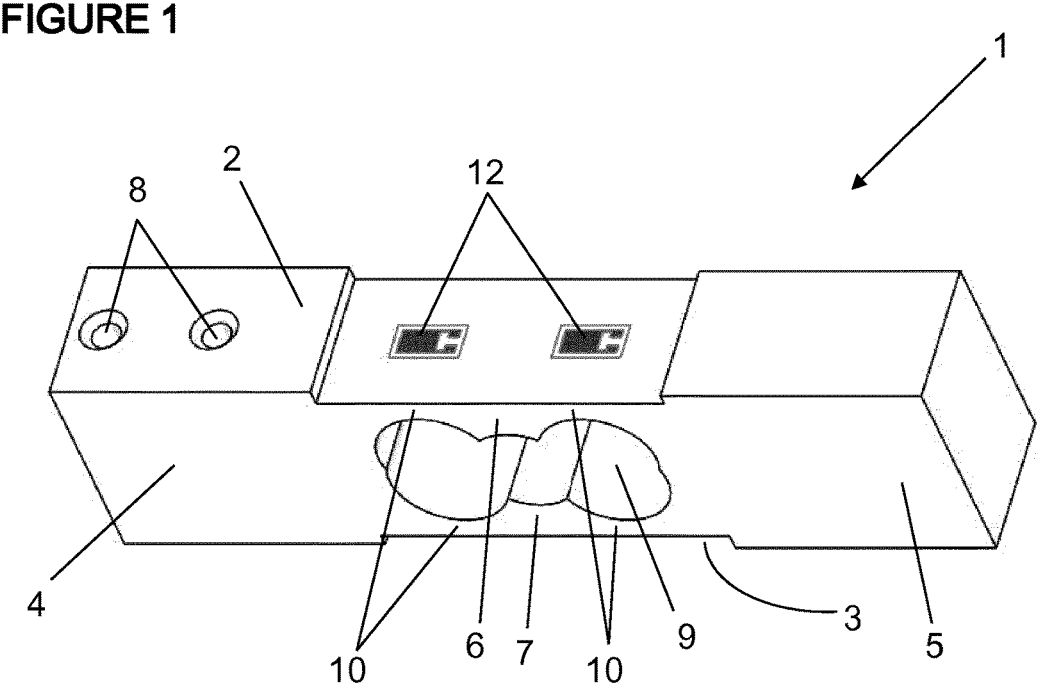

FIG. 1 shows a dual-beam cantilever load cell 1 with a top side 2 and a bottom side 3 (not visible), a load-receiving end portion 4 and a mounting end portion 5, an upper bending beam portion 6 and a lower bending beam portion 7. The load-receiving end portion 4 has two threaded holes 8 from the top side 2 for the attachment of a weighing platform or other kind of load receiver. The mounting end portion 5, analogously, has two threaded holes from the bottom (not visible in the drawing) to mount the load cell 1 on the base plate of a weighing scale (not shown) or on any other kind of supporting understructure. The bending beam portions 6, 7 are formed by machining an appropriately contoured opening 9 through the center of the load cell 1. The opening 9 is shaped to form thin bridge portions 10 in the bending beam portions 6, 7. Four strain gauges 12 two on the top bending beam portion 6 and two (not visible) on the lower bending beam portion 7 are mounted with their resistor tracks exactly aligned and centered over the thin bridge portions 10. The principles of wiring the four strain gauges 12 in a Wheatstone bridge circuit and obtaining an electrical signal representative of a weighing load applied to the load-receiving end portion 4 of a dual-beam cantilever load cell 1 are well known in the art (see for example U.S. Pat. No. 5,052,505) and will therefore not be further described here.

Figure 2:
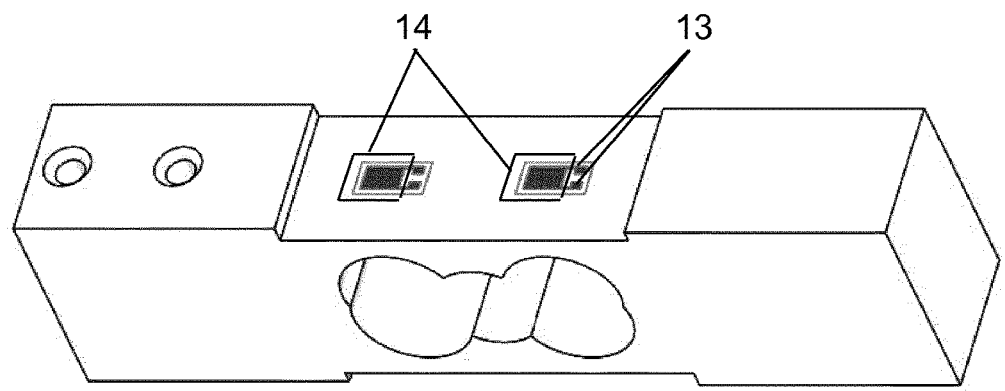
FIG. 2 shows the load cell of FIG. 1 with the coated cover layer installed on top of the strain gauges.

FIG. 2 shows the same load cell 1 after coated cover layers 14 have been installed on top of the strain gauges 12 by means of a commercially available strain gauge adhesive, for example M-Bond 43B made by Vishay Precision Group, Micro-Measurements, 951 Wendell Blvd., Wendell, NC 27591, USA. The area covered by coated cover layers 14 extends somewhat beyond the borders of each strain gauge 12. The electrode pads 13 are left partially uncovered, so that circuit wires can be soldered or welded to them.

The load cell in FIGS. 1 and 2 could also be replaced by a rocker pin load cell or any object on which strain measurements are to be performed, for example pressure sensors, or landing gears of airplanes or the chassis frames of trucks, as well as machines for static and dynamic testing and building structures.

Figure 3:
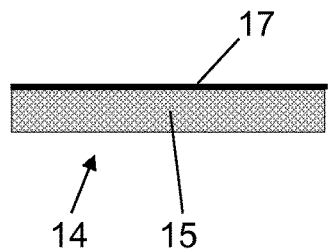
FIG. 3 shows a cross-section of a coated cover layer with moisture barrier coating applied to one side of the polymer foil.
Figure 4:
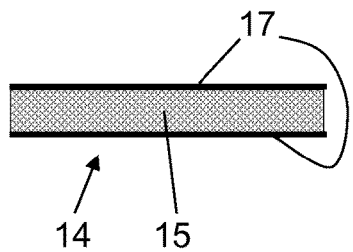
FIG. 4 shows a cross-section of a coated cover layer with moisture barrier coating applied to both sides of the polymer foil.
Figure 5:
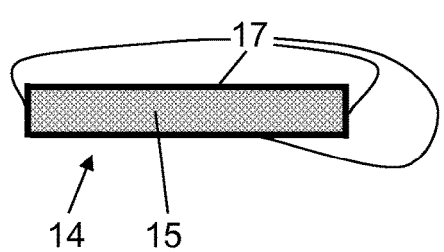
FIG. 5 shows a cross-section of a coated cover layer encapsulated in moisture barrier coating which is applied to both sides as well as to the very narrow surface strips around the border of the polymer foil.

The base material for the coated cover layer 14 (see FIGS. 3 to 5) is a thin sheet of polymer material 15. According to the invention, the polymer sheet material 15 receives its moisture-insulating property from a moisture barrier coating 17 of inorganic material, which is applied to the polymer sheet material 15 in a deposition process. The inorganic moisture barrier coating 17 can be applied to one side of the polymer sheet material 15 (FIG. 3), to both sides (FIG. 4), or to both sides as well as to the very narrow surface strips around the border (FIG. 5), so that the polymer material 15 is encapsulated by the moisture barrier coating 17. The thickness of the coated cover layer 14 for a low-capacity dual-cantilever load cell 1 is within the range of micrometers. A greater thickness is feasible for load cells of higher weighing capacity, for example shear beam load cells and column load cells. Coated cover layers 14 as thick as, for example, 500 µm (micrometers) appear feasible for such high-capacity load cells and are considered to lie within the scope of this invention. Polymers that are suitable for the basic polymer sheet material 15 include for example PET (polyethylene terephthalate), polyimide, PEEK (polyether ether ketone) and related materials such as KAPTON (a polyimide film developed by DuPont). Non-metallic inorganic materials that are suitable for the moisture barrier coating 17 used in the method according to the invention include for example $SiO_2$, $Al_2O_3$, TiO and SiN. Also possible are inorganic-organic multi-layered structures. The typical thickness of the moisture barrier coating 17 is less than 200 nanometers, but can go up to 2000 nanometers, depending on the manufacturing process used.

Figure 6:
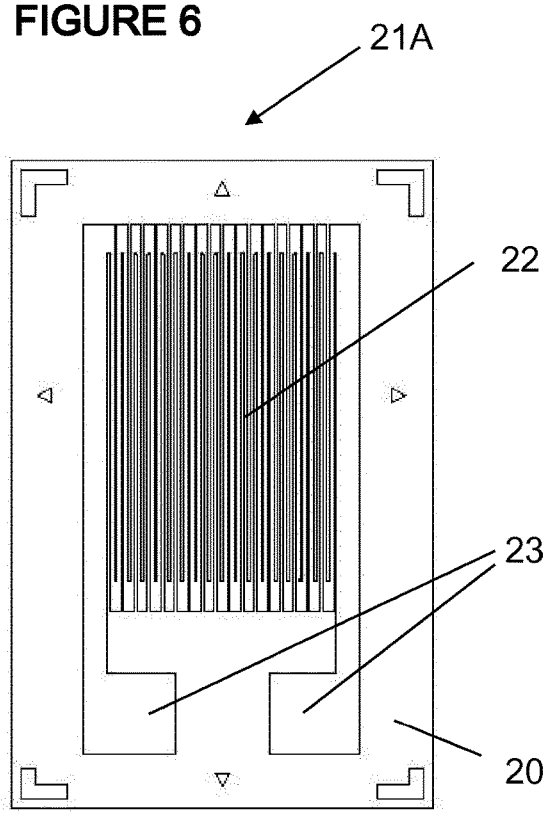
FIG. 6 represents a top view of a strain gauge without mechanical protection cover.
Figure 7A:
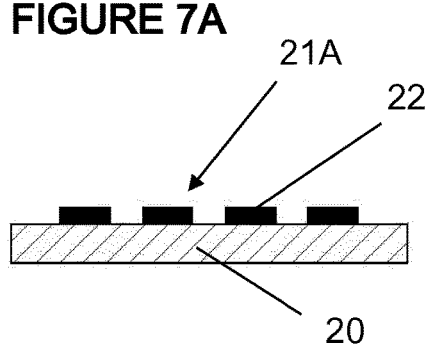
FIG. 7A represents a cross-sectional view of a strain gauge without mechanical protection cover.

According to their layer structure, there are two commercially available types of strain gauges. In a so-called open-faced strain gauge 21A (top view in FIG. 6 and cross-section in FIG. 7A), the metallic resistor track 22 in the form of a meandering structure ending in electrode pads 23 and backed by a base layer 20 from polymer substrate foil is exposed on top, i.e. the open-faced strain gauge 21A has no mechanical protection cover. In a so-called protected strain gauge 25A (top view in FIG. 8 and cross-section in FIG. 9A), the resistor track 22 is protected by a mechanical protection cover 26, for example a polyimide layer. The method according to the present invention is applicable to open-faced strain gauges 21A as well as protected strain gauges 25A.

Figure 9A:
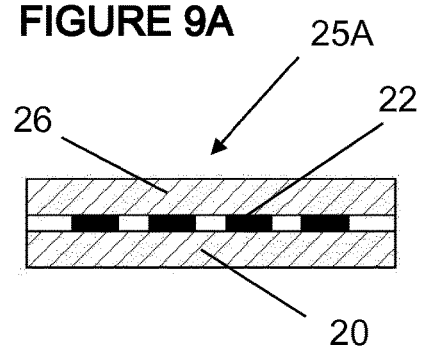
FIG. 9A represents a cross-sectional view of a strain gauge with mechanical protection cover.
Figure 7B:
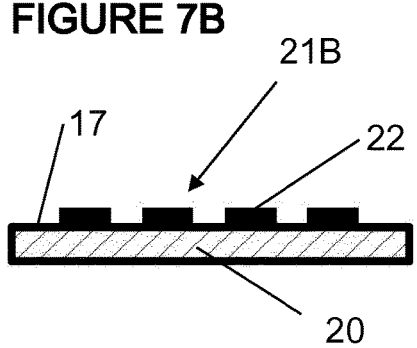
FIG. 7B represents a cross-sectional view of a strain gauge without mechanical protection cover with moisture barrier coating which is applied to both sides as well as to the very narrow surface strips around the border of the base layer.
Figure 9B:
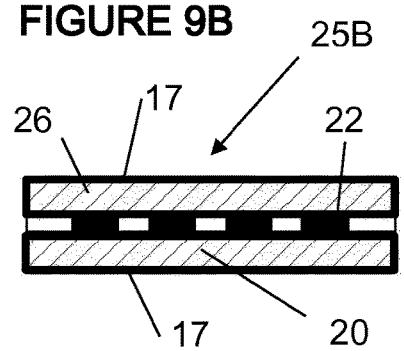
FIG. 9B represents a cross-sectional view of a strain gauge with mechanical protection cover with moisture barrier coating which is applied to both sides as well as to the very narrow surface strips around the border of the base layer.

FIG. 7B and FIG. 9B are showing the same layer structures of the strain gauge 21A and strain gauge 25A with the difference that on the surface of the base layer 20 a moisture barrier coating 17 has been applied prior to the arrangement of a resistor track in the shape of a meandering structure and the electrode pads.

Figure 10:
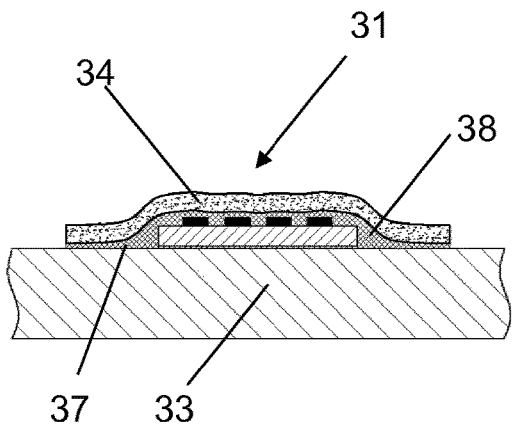
FIG. 10 represents a cross-sectional view of a strain gauge without mechanical protection cover, which is installed in a strain-sensing area of a load cell, with coated cover layer installed.
Figure 11:
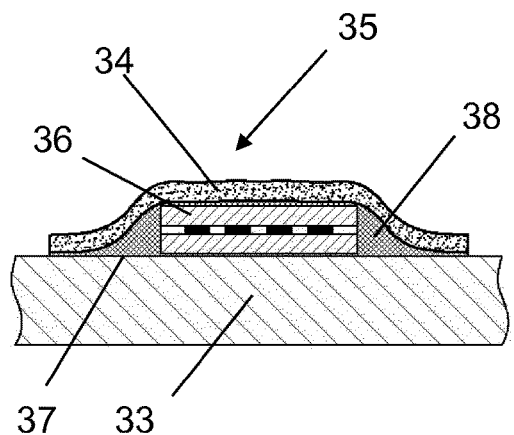
FIG. 11 represents a cross-sectional view of a strain gauge with mechanical protection cover, which is installed in a strain-sensing area of a load cell, with coated cover layer installed.

In the method according to the invention, the step of applying the coated cover layer to the strain gauge can be implemented in different ways, as exemplified by (but not limited to) the following detail procedures 1, 2, and 3:

Under Detail Procedure 1, the installation of strain gauges on the body of a load cell and the installation of the coated cover layer over the surface of the strain gauge are combined with each other. As shown in FIG. 10 for a strain gauge 31 without a mechanical protection cover and in FIG. 11 for a strain gauge 35 with a mechanical protection cover 36, after the strain gauge 31, 35 has been set in place on the body 33 of a load cell with a strain gauge adhesive, a coated cover layer 34 is laid over an area including the strain gauge 31, 35 and an adjoining border area 37 of the surface of the load cell body 33, using a strain gauge adhesive 38 such as the previously mentioned M-Bond 43B. The adhesive bond 38 can also act as a surface-smoothing layer. If the coated cover layer 34 has a one-sided moisture barrier coating (as in FIG. 3), coated cover layer 34 is installed with the coated side facing outward. An inward facing coated side is also possible and shall fall under the scope of the invention, but is less effective. Here, the electrode pads 43 of the strain gauge are left at least partially uncovered by the coated cover layer so that circuit wires can be soldered or welded to them. The strain gauges 31, 35 and the coated cover layer 34 are fixated on the load cell body 33 by clamping, and the load cell is placed into an oven where the adhesive bonds 38 of the strain gauges 31, 35 and the coated cover layer 34 are heat-cured together.

Under Detail Procedure 2, the coated cover layer 34 is installed on strain gauges 31, 35 that have already been heat-cured and are permanently bonded to a load cell body 33. As in Detail Procedure 1, the coated cover layer 34 is laid over an area including the strain gauge 31, 35 and an adjoining border area 37 of the surface of the load cell body 33, using for example the previously mentioned M-Bond 43B. Coated cover layer 14 with one-sided moisture barrier coating 17 is installed with the coated side facing outward. Here, the electrode pads 43 of the strain gauge 31, 35 are at least partially outside the coated cover layer 34 so that circuit wires can be soldered or welded to them. The load cell is placed in an oven to heat-cure the adhesive bond 38 of the coated cover layer 34. Optionally, as a variant of Detail Procedure 2, the coated cover layer 34 can also be installed with a room-temperature-curing adhesive, in which case the adhesive bond of the coated cover layer 34 solidifies within a specified time period without oven-curing.

The coated cover layer 14, 34, 44 provides a high degree of protection, as no moisture can traverse the moisture barrier coating 17 of the polymer film 15. Lateral penetration of moisture through the adhesive layer between the coated cover layer 14, 34, 44 and the surface of the load cell body 33 is minimized, as the exposed border of the adhesive layer is only 2 to 5 µm (micrometers) thick and the travel distance for the moisture molecules from the exposed border to the resistor tracks 22 of the strain gauge 31, 35 is relatively long.

Figure 12A:
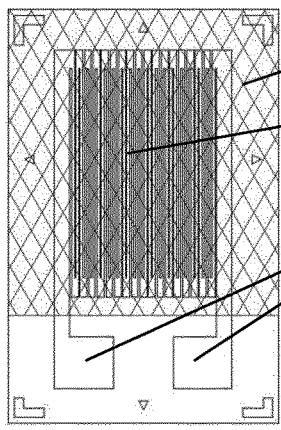
FIG. 12A represents a top view of a strain gauge protected with coated cover layer.
Figure 13:
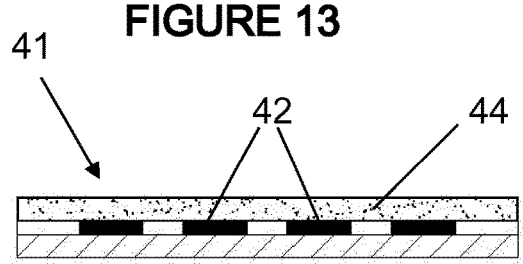
FIG. 13 represents a cross-sectional view of a strain gauge without mechanical protection cover, protected with coated cover layer.
Figure 14:
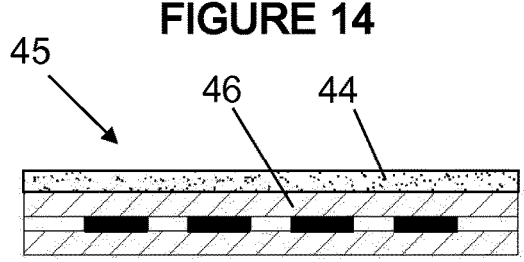
FIG. 14 represents a cross-sectional view of a strain gauge with mechanical protection cover, protected with coated cover layer.

Under Detail Procedure 3, the coated cover layer 14, 34, 44 is installed during the manufacturing process of strain gauges, so that the resultant product is a moisture-insulated strain gauge. The installation of the coated cover layer 14, 34, 44 can be performed on individual strain gauges or on multi-unit sheets that are subsequently cut up into individual strain gauges. Strain gauges are normally produced in the form of multi-unit sheets, which are subsequently cut up into the final form of individual strain gauges that represent the final product. FIG. 12A shows a top view of a strain gauge 41, 45 (FIGS. 13 and 14) on which a coated cover layer 44 has been installed according to the method of the invention. The strain gauge of FIG. 12A can be an open-faced strain gauge 21A, 41 (as shown in cross-section in FIGS. 7A and 13) without a mechanical protection cover over the resistor tracks 42, or it can be an protected strain gauge 25A, 45 (as shown in cross-section in FIGS. 9A and 14) with a mechanical protection cover 26, 46 between the resistor tracks 42 and the coated cover layer 44.

Figure 8:
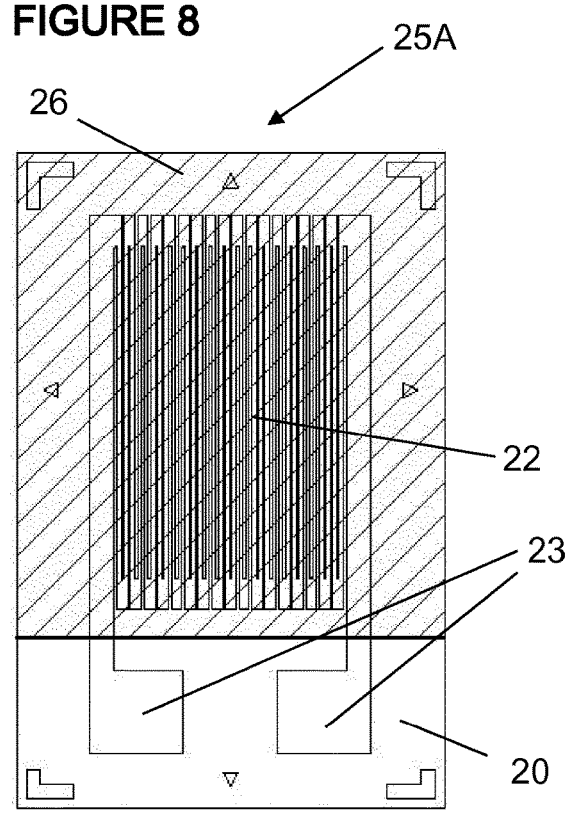
FIG. 8 represents a top view of a strain gauge with mechanical protection cover.
Figure 12B:
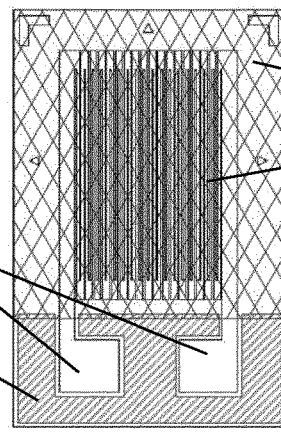
FIG. 12B represents a top view of a strain gauge protected with coated cover layer with the uncovered surface of the strain gauge overlaid by additional metallic material that remains on the strain gauge after the chemical etching.

When leaving the electrode pads 13, 23, 43 at least partially uncovered by the coated cover layer 14, 34, 44 as shown in FIGS. 1, 8 and 12A, the uncovered surface of the strain gauge can be overlaid by additional metallic material 48 (see FIG. 12B) that remains on the strain gauge after the chemical etching like the resistor track and the electrode pads 43. A small gap ensures that no electrically conductive connection exists between the additional metallic material 48 and the resistor track 42 or the electrode pads 43.

Figure 12C:
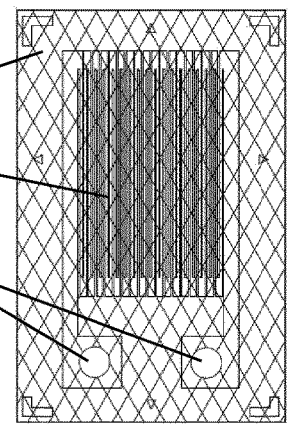
FIG. 12C represents a top view of a strain gauge protected over its entire surface with a coated cover layer that has an opening for contacting the electrode pads.

As an alternative to leaving the electrode pads 13, 23, 43 at least partially uncovered by the coated cover layer 14, 34, 44 as shown in FIGS. 1, 8 and 12A, the entire strain gauge 12, 21A, 21B, 25A, 25B, 31, 35, 41, 45 can be overlaid with the coated cover layer 14, 34, 44. In this case, an opening 47 is made through the coated cover layer 14, 34, 44 to the electrode pads 13, 23, 43 (see FIG. 12C) to ensure that circuit wires can be soldered or welded to them. The strain gauge of FIG. 12C can also be a moisture-insulated open-faced strain gauge 21B as shown in FIG. 7B without a mechanical protection cover over the resistor tracks 42, or it can be a moisture-insulated protected strain gauge 25B as shown in FIG. 9B.

While the invention has been described through the presentation of specific examples relating to load cells, it is considered self-evident that other applications as well as other ways of implementing the inventive method are likewise encompassed by the teachings of the present invention.

In particular, the inventive method of manufacturing a strain gauge which is insulated against moisture penetration is not limited to the moisture protection of strain gauges in load cells that are used in weighing, but can be used generally for strain gauges that need protection against moisture without the drawback of compromising the measurement accuracy as a result of the protective measures. This includes for example strain gauges used in pressure sensors, or strain gauges used in the landing gears of airplanes or built into the chassis frames of trucks, as well as strain gauges used for static and dynamic testing of machines and building structures. Such applications and variations of the concepts described and claimed herein are considered to fall within the scope of protection that is hereby sought for the present invention.

LIST OF REFERENCE SYMBOLS 1 dual-beam cantilever load cell
2 top side
3 bottom side
4 load-receiving end portion
5 mounting end portion
6 upper bending beam portion
7 lower bending beam portion
8 threaded holes
9 contoured opening
10 thin bridge portions
12 strain gauges
13, 23, 43 electrode pads
14, 34, 44 coated cover layer
15 thin sheet of polymer material, base material of 14, cover layer
17 moisture barrier coating
20 base layer
21A, 31, 41 open-faced strain gauge
21B moisture-insulated open-faced strain gauge
22, 42 resistor tracks
25A, 35, 45 protected strain gauge
25B moisture-insulated protected strain gauge
26, 36, 46 mechanical protection cover
33 body of load cell
37 border area adjoining the strain gauge 31, 35
38 adhesive bond
47 openings
48 additional metallic material

The invention claimed is:

1. A strain gauge insulated against moisture penetration, the strain gauge comprising:
   a base layer of a polymer substrate foil material;
   a resistor track layer on a metallic resistive foil material, the resistor track being in the shape of a meandering structure and having electrode pads for contacting the resistor track, the resistor track layer being laminated together with the base layer; and
   a strain gauge produced by means of a chemical etching method on the laminated base and resistor track layers;
   wherein at least one of the following obtains:
      a moisture barrier coating is formed, by means of a deposition process, on all sides of the base layer so that the moisture barrier coating encapsulates the base layer; or
      the strain gauge further comprises a cover layer of a polymer film foil material and with a moisture barrier coating formed, by means of a deposition process, on at least one side of the cover layer, providing a coated cover layer that is overlaid on the surface of the resistor track layer to cover at least part of the strain gauge.

2. The strain gauge of claim 1, further comprising:
   additional metallic material from the resistor track layer that overlies the surface of the strain gauge which is uncovered from the coated cover layer such that no electrically conductive connection exists between the additional metallic material and the resistor track or the electrode pads.

3. The strain gauge of claim 1, wherein:
   the coated cover layer is overlaid to cover the entire strain gauge; and
   an opening is made through the coated cover layer to the electrode pads of the strain gauge.

4. The strain gauge of claim 1, wherein:
   the moisture barrier coating is deposited on at least the top and bottom sides of the cover layer so that the moisture barrier coating encapsulates the cover layer.

5. The strain gauge of claim 1, wherein the moisture barrier coating has a thickness of less than or equal to 200 nanometers.

6. A load cell, comprising:
   a load cell body or an object on which strain measurements are to be performed; and
   a strain gauge according to claim 1, applied by use of an adhesive bonding agent.

7. A method of manufacturing a strain gauge that is insulated against moisture penetration, the method comprising the steps of:
   providing a polymer substrate foil material to serve as a base layer;
   laminating the base layer to a resistor track layer on a metallic resistive foil material, the resistor track having the shape of a meandering structure and electrode pads for making contact with the resistor track;
   chemically etching a strain gauge on the laminated layers; and
   insulating the strain gauge from moisture penetration by:
      before laminating the base layer to the resistor track layer, encapsulating the base layer in a moisture barrier coating formed on all surface sides of the base layer, using a deposition process;
      providing a cover layer of a polymer film foil material;
      producing a coated cover layer by using a deposition process to form a moisture barrier coating on the cover layer; and
      applying the coated cover layer to the strain gauge to cover at least a part thereof.

8. The method of claim 7, further comprising the step of:
   overlaying a surface portion of the strain gauge that is not covered by the coated cover layer with additional metallic material from the resistor track layer, wherein no electrically conductive connection exists between the additional metallic material and the resistor track or the electrode pads.

9. The method of claim 7, wherein the entire strain gauge is covered by overlaying by the coated cover layer and an opening is made through the coated cover layer to provide access therethrough to the electrode pads.

10. The method of claim 7, wherein the moisture barrier coating has a thickness of less than or equal to than 200 nanometers.

11. The method of claim 7, wherein the moisture barrier coating is deposited on all sides of the cover layer so that the cover layer is encapsulated by the moisture barrier coating.

12. A method of installing a strain gauge on a body of a load cell or on any object on which strain measurements are to be performed, the method comprising the steps of:
- adhering, with an adhesive bonding agent, a strain gauge or a strain gauge according to claim 1, to a load cell body or on any object on which strain measurements are to be performed;
- producing a coated cover layer by using a deposition process to form a moisture barrier coating on at least one surface of a cover layer of a polymer film foil material and all sides of a base layer so that the moisture barrier coating encapsulates the base layer;
- overlaying the coated cover layer to cover at least a part of the strain gauge, using the adhesive bonding agent;
- fixing the combined strain gauge and coated cover layer on the load cell body or on any object on which strain measurements are to be performed, by applying contact pressure, and
- placing the fixed combination of the strain gauge and coated cover layer on the load cell body or said object on which strain measurements are to be performed in an oven to heat-cure and solidify the adhesive bond of the strain gauge and coated cover layer.

13. A method for installing a coated cover layer on a strain gauge or a strain gauge according to claim 1 which has already been installed onto a load cell body or another object on which strain measurements are to be performed, the method comprising the steps of:
- providing a load cell body or another object on which strain measurements are to be performed with at least one strain gauge that has been installed and has undergone a heat-curing of an adhesive bond thereof;
- producing a coated cover layer by using a deposition process to form a moisture barrier coating on at least one surface of a cover layer formed of a polymer film foil material;
- overlaying the coated cover layer to cover at least a part of the at least one installed strain gauge, by applying a heat-curing adhesive bonding agent or applying a room-temperature-curing adhesive bonding agent;
- applying contact pressure to fix the installation of the coated cover layer on the at least one strain gauge; and
- solidifying the adhesive bond of the coated cover layer by placing the load cell body or the other object on which strain measurements are to be performed with the fixed coated cover layer on the at least one installed strain gauge either:
  - in an oven to heat-cure and solidify the adhesive bond in the case of a heat-curing adhesive bond of the coated cover layer; or
  - at room temperature for a prescribed time period to cure and solidify the adhesive bond in the case of a room-temperature-curing adhesive bond of the coated cover layer.

14. A method for insulating a plurality of strain gauges from moisture penetration by of installing a coated cover layer during a manufacturing process of a plurality of strain gauges or a plurality of strain according to claim 1, the method comprising the steps of:
- providing a plurality of strain gauges, as individual strain gauges, as at least one multi-unit sheet of strain gauges, or as a combination of both;
- producing a coated cover layer by forming a moisture barrier coating on the surface of a cover layer of a polymer film foil material, by means of a deposition process;
- overlaying the coated cover layer with application of an adhesive bonding agent to cover at least a part of the plurality of strain gauges;
- fixing the installation of the coated cover layer on the plurality of strain gauges under application of contact pressure; and
- curing the plurality of strain gauges having the coated cover layer at a prescribed temperature and for a prescribed time period to solidify the adhesive bonds between the coated cover layer and the plurality of strain gauges.

15. The method of claim 12, wherein the surface of the strain gauge, which is uncovered from the coated cover layer, is overlaid by additional metallic material from the resistor track, wherein no electrically conductive connection exists between the additional metallic material and the resistor track or the electrode pads.

16. The method of claim 12, wherein the coated cover layer is overlaid to cover the entire strain gauge, and wherein the method comprises the further step of:
- making an opening through the coated cover layer to electrode pads of the strain gauge.

17. A method of manufacturing a strain gauge that is insulated against moisture penetration, the method comprising the steps of:
- providing a polymer substrate foil material to serve as a base layer;
- laminating the base layer to a resistor track layer on a metallic resistive foil material, the resistor track having the shape of a meandering structure and electrode pads for making contact with the resistor track;
- chemically etching a strain gauge on the laminated layers; and
- insulating the strain gauge from moisture penetration by:
  - providing a cover layer of a polymer film foil material;
  - producing a coated cover layer by using a deposition process to form a moisture barrier coating the cover layer; and
  - applying the coated cover layer to the strain gauge to cover at least a part thereof;
- wherein the moisture barrier coating is deposited on all sides of the cover layer so that the cover layer is encapsulated by the moisture barrier coating.

18. The method of claim 17, further comprising the step of:
- overlaying a surface portion of the strain gauge that is not covered by the coated cover layer with additional metallic material from the resistor track layer, wherein no electrically conductive connection exists between the additional metallic material and the resistor track or the electrode pads.

19. The method of claim 17, wherein the entire strain gauge is covered by overlaying by the coated cover layer and an opening is made through the coated cover layer to provide access therethrough to the electrode pads.

20. The method of claim 17, wherein the moisture barrier coating has a thickness of less than or equal to than 200 nanometers.

21. The method of claim 13, wherein the surface of the strain gauge, which is uncovered from the coated cover layer, is overlaid by additional metallic material from the resistor track, wherein no electrically conductive connection exists between the additional metallic material and the resistor track or the electrode pads.

22. The method of claim 13, wherein the coated cover layer is overlaid to cover the entire strain gauge, and wherein the method comprises the further step of:

making an opening through the coated cover layer to electrode pads of the strain gauge.

23. The method of claim 14, wherein the surface of the strain gauge, which is uncovered from the coated cover layer, is overlaid by additional metallic material from the resistor track, wherein no electrically conductive connection exists between the additional metallic material and the resistor track or the electrode pads.

24. The method of claim 14, wherein the coated cover layer is overlaid to cover the entire strain gauge, and wherein the method comprises the further step of:
making an opening through the coated cover layer to electrode pads of the strain gauge.

* * * * *